United States Patent [19]

Mauritz

[11] Patent Number: 5,353,742
[45] Date of Patent: Oct. 11, 1994

[54] LIQUID FEEDER FOR BIRDS
[75] Inventor: John G. Mauritz, Chanhassen, Minn.
[73] Assignee: William R. Dahlke, Naples, Fla.
[21] Appl. No.: 134,722
[22] Filed: Oct. 12, 1993
[51] Int. Cl.⁵ ............................................. A01K 39/00
[52] U.S. Cl. ..................................... 119/77; 119/52.2
[58] Field of Search .................... 119/77, 73, 72, 52.2, 119/52.3

[56] References Cited

U.S. PATENT DOCUMENTS

| | | | |
|---|---|---|---|
| 1,566,571 | 12/1925 | Appleton | 119/77 |
| 2,573,802 | 11/1951 | Mitchell | 119/77 |
| 3,292,589 | 12/1966 | Williams | 119/77 |
| 4,938,168 | 7/1990 | Meidell | 119/77 |
| 5,183,005 | 2/1993 | Tyler | 119/52.2 |
| 5,195,463 | 3/1993 | Lorenzana | 119/77 |

FOREIGN PATENT DOCUMENTS 204428  12/1986  European Pat. Off. ........... 119/52.2

Primary Examiner—Gene Mancene
Assistant Examiner—Todd E. Manahan
Attorney, Agent, or Firm—Warren A. Sturm

[57]  ABSTRACT

An improved bird feeder for feeding liquid food to hummingbirds and the like having an integral liquid food shutoff and a liquid food metering receptacle to control, at the reservoir face, the amount of liquid food available to the hummingbirds responsive to the removal of liquid food by the hummingbirds.

7 Claims, 3 Drawing Sheets

LIQUID FEEDER FOR BIRDS

BACKGROUND OF THE INVENTION

The invention relates to an apparatus for feeding aqueous liquid food to hummingbirds, orioles and the like. The invention combines a feeder using new liquid flow control system to meter the liquid food from the pre-filled reservoir with a cover which in the shipping position provides an attractive container to draw the purchaser's attention to the product and when in the hanger position allows the purchaser to hang the invention from a convenient tree limb or other suitable location.

Many types of devices are known for supplying an aqueous liquid food to wild birds. Such devices generally contain a reservoir for nutrient solutions, and are designed to release solution on a demand basis, thereby conserving the quantity of solution dispensed. In the case of feeders designed for hummingbirds, special consideration must be given to the fact that the bird has a long slender beak, and sometimes remains in hovering motion while feeding.

It has become a rather popular pastime to feed and watch wild birds at a feeder at one's residence. The feeding of birds not only provides a pleasant pastime for the residents, but also, provides necessary food for the birds during times of diminished natural food supply. Bird feeding has allowed a variety of bird species to extend their historic range into areas where they could not survive without human assistance and to winter further north or in a more severe climate.

Hummingbirds are of particular interest owing to their bright vibrant colors, their tiny size, and their unusual flight patterns. Hummingbirds, however, are not drawn to the conventional bird feeder serving solid food. In the wild, hummingbirds feed on the nectar of a variety of plants and small insects. To feed hummingbirds, therefore, man is limited to providing nectar or a nectar substitute.

The prior art shows several examples of feeders for feeding liquid food to birds. U.S. Pat. No. 4,558,662 issued Dec. 17, 1985 to W. Peterson shows a typical hummingbird feeder of one type having an inverted reservoir for holding a supply of liquid food and a dispenser tube for the hummingbirds to feed from. The Peterson patent is for an apparatus for adapting a previously used beverage can into a hummingbird feeder. While the Peterson device admirably performs its functions, it has several shortcomings. It uses surface tension of the liquid food to retain the liquid in the reservoir and as such is susceptible to unwanted dispensing of the food from the wind tilting the container. Secondly, standard design beverage cans are usually fabricated from aluminum sheet which is opaque and unless the beverage can happens to be red, its color will not attract the hummingbirds and, secondly, one is unable to readily determine the amount of liquid remaining in the feeder.

U.S. Pat. No. 4,901,673 issued Feb. 20, 1990 to R. Overstreet describes a typical hummingbird feeder of a second group. The Overstreet feeder discloses a feeder having in inverted reservoir with a flattened conic base for a feeding area. The liquid is retained in the reservoir by atmospheric pressure so long as the liquid level in the base is at or above the feeding apertures. The Overstreet patent is drawn to the additional insect inhibiting attachment to the feeder.

SUMMARY OF THE INVENTION

Accordingly, it is an object of the present invention to provide a device for unattendedly dispensing liquid nutrient to a bird, the rate of liquid dispensed being substantially equal to the rate at which liquid is removed by the bird.

It is another object of this invention to provide a device as in the foregoing objective adapted to be suspended from an overhead support.

It is another object of the invention to provide an environmentally friendly device by shipping a prefilled, refillable bird feeder.

It is another object of the invention to provide a feeder device of the aforesaid nature of simple and rugged design and low manufacturing cost.

It is another object of the invention to provide a feeder having upwardly extending feeding stations which reduce wastage by lowering spillage of the liquid food.

These and other objects and advantages of the invention will be apparent from the following description and the appended drawings.

DESCRIPTION OF THE PREFERRED EMBODIMENT

Figure 1:
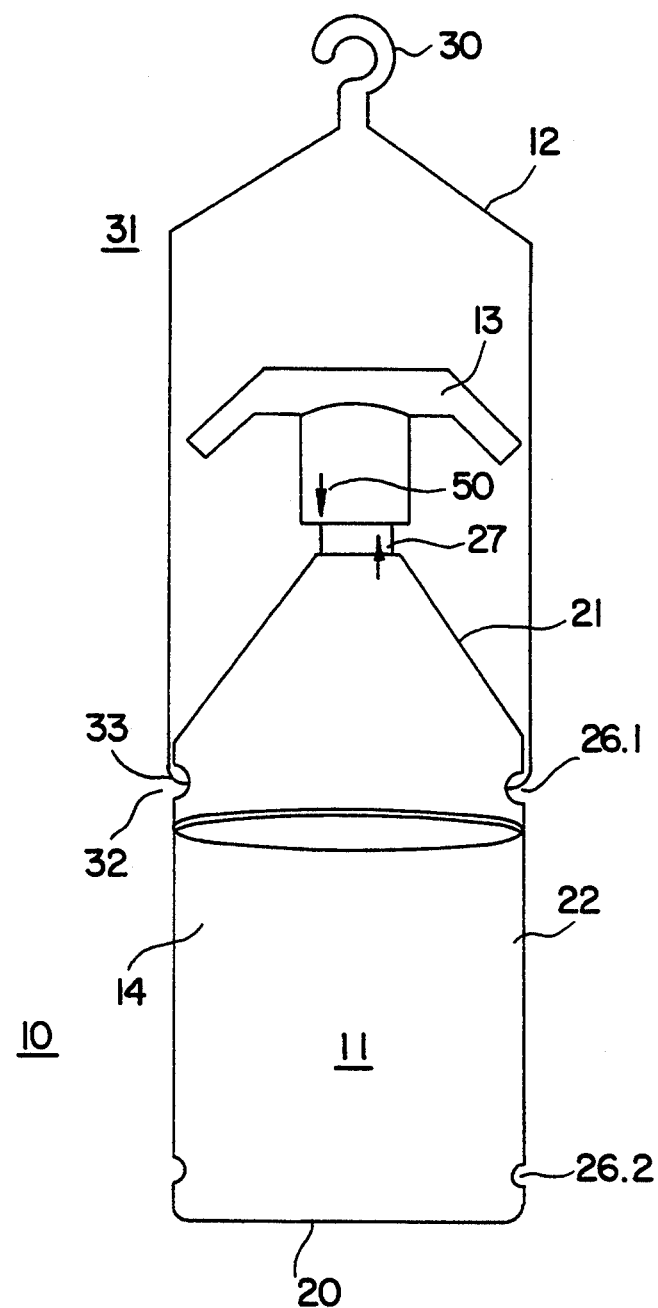
FIG. 1. is an overall view of the bird feeder shown packaged in its shipping position.

The bird feeder 10, as shown in FIG. 1, consists of the reservoir 11, the cover 12, and the dispenser 13. The reservoir holds the bulk supply of liquid food 14.

Reservoir 13 is of conventional construction having a flat base 20 and a tapered end 21. The body 22 of the reservoir 11 extends between the base 20 and the tapered end 21. The tapered end 21 of the reservoir 11 terminates in the cylindrical rotatable attachment means 23 for attachment to dispenser 13. Reservoir 11 may be constructed of any suitable material and is preferably constructed from a transparent or translucent plastic and is fabricated by blow molding. Reservoir 11 may constructed with any suitable cross section such as a round cross-section for ease of molding and convenience in shipping, likewise, the color of the reservoir may be any color and is preferably a hue of red to attract hummingbirds.

Figure 2:
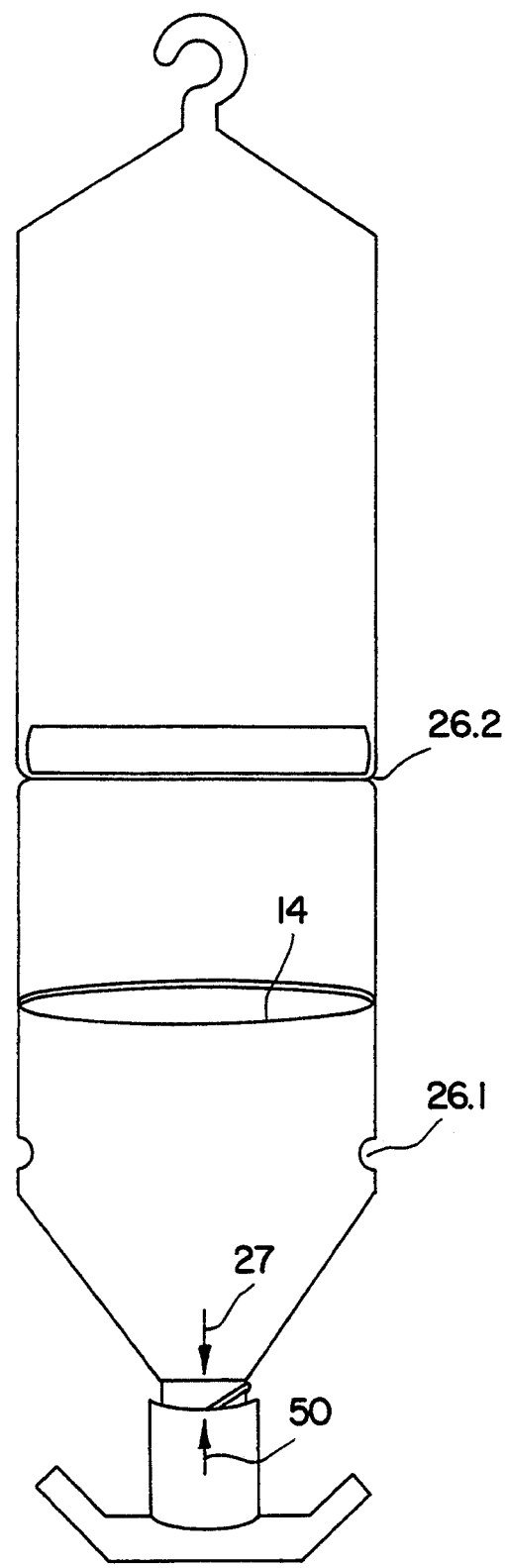
FIG. 2. is an overall view of the bird feeder shown with the hanger extended in the position for feeding birds.

The means for detachably attaching the cover 12 to the reservoir 11 is preferably a peripheral inwardly extending annular groove 26. Annular groove 26.1 for assembly in the shipping position, as shown in FIG. 1, is located on the reservoir body 22 near the junction of the body 22 with the tapered end 21. The annular groove 26.2 for assembly in the feeding position, as shown in FIG. 2 is located on the reservoir body 22 near the junction of the body 22 with be base 20.

The rotatable attachment means may-be of several constructions and in a preferred embodiment is comprised of external threads 24 formed about the periphery of the rotatable attachment means 23. A first liquid communications passage 25 extends from the interior of the reservoir 11 and through the rotatable attachment means 23. The liquid communications passage 25 is located off center and along a radius of the rotatable attachment means 23. An alignment mark 27 is formed on the periphery of the tapered end 21 on the radius of first liquid passage 25.

Cover 12 may be constructed from any suitable material and is preferably constructed from plastic. The cover 12 may be tubular so as to completely enclose the reservoir 11 or the dispenser 13 when in the feeding and shipping positions, respectively. Cover 12 is of thin wall construction having a hanger 30 at its first end 31 and being open at a second end 32. The hanger may be of any suitable construction and shape and is preferably a molded with a hook for attachment to a tree limb or the like. The cover 12 is dimensioned so as to fit readily about the reservoir 11 and the dispenser 13.

Detachable attachment means is formed on the second end 32 of the cover 12. The detachable attachment means may be of any suitable construction and is preferably an inwardly extending lip 33 sized to mate with the annular grooves 25 of the reservoir 11. Attachment or detachment is effected by applying pressure to the cover 12 to deform the lip 33 so that it passes and is either retained by the annular groove 26 or is removed the reservoir 11.

Dispenser 13 may be constructed of any suitable material and is preferably constructed by blow molding an appropriate plastic to the proper shape. The plastic used to construct the dispenser 13 may be opaque, translucent, or transparent without effecting function.

The neck 40 is adapted to removably attach to the reservoir 11 rotatable attachment means 23. Neck 40 may be constructed many ways and in a preferred embodiment is constructed having internal threads 41 sized to mate with the external threads 24 of the :reservoir 11.

Figure 4:
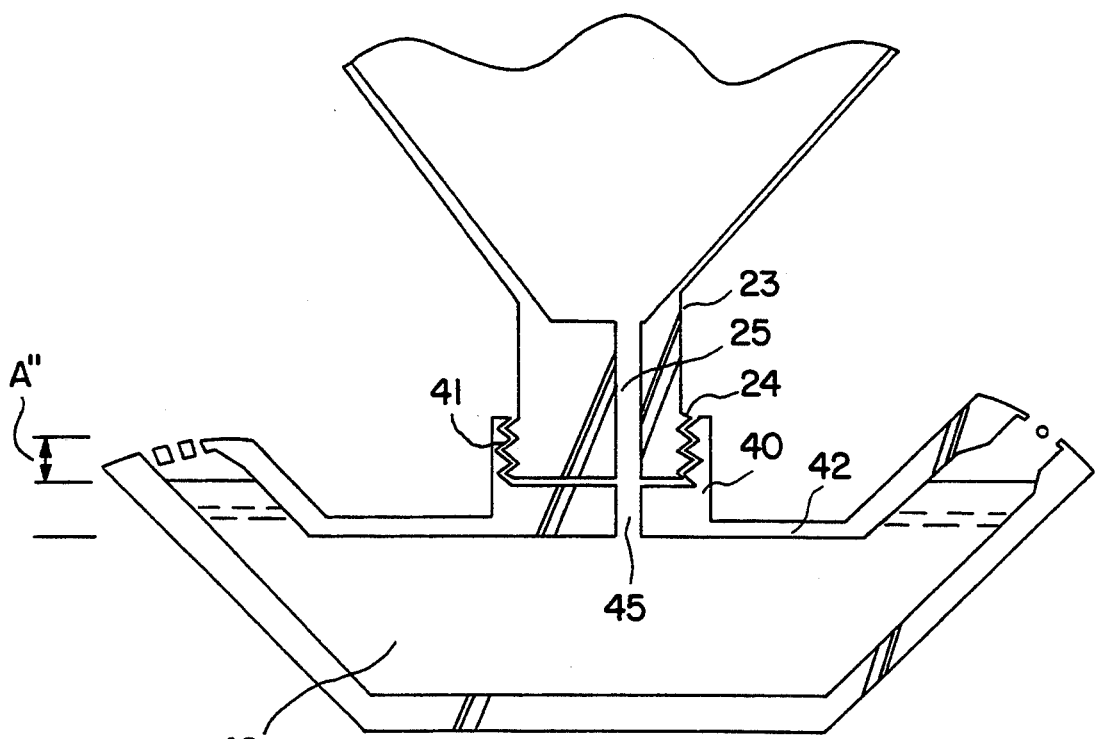
FIG. 4 is an enlarged partial cutaway view of the reservoir and dispenser parts of the feeder in the feeding position showing the rotatable attachment means in the feeding position.

The dispenser 13 is constructed having an upwardly extending neck 40 and a hollow base 42. The neck 41 has a central opening 43 extending downwardly toward the base 42. The central opening 43 terminates in a planar face 44 for mating with the terminal end of the tapered end 21 of the reservoir 11. Located outwardly from the planar face 44 is a second liquid communications passage 45. Second liquid passage 45 is located off center and along a radius of the central opening 43. An alignment mark 50 is formed on the periphery of the neck 40 on the radius of second liquid passage 45. As shown in FIG. 4, the second liquid passage 45 may be aligned with the first liquid passage 25 to allow the liquid food 14 to flow from the reservoir 11 into the hollow base 42 when the bird feeder is in the feeding position.

The hollow of base 42 forms a metering reservoir 46. Extending radially outward from the metering reservoir 46 are a plurality of feeding stations 47. The feeding stations 47 terminate in upwardly turned feeding receptacles 48. Each feeding receptacle 48 has at least one feeding orifice 49 on its upward terminal end. The feeding orifices 49 are sized to conveniently accept the beak of the desired birds, for example, a smaller feeding orifice 49 is used for hummingbirds and a larger feeding orifice 46 is used for orioles.

The number of feeding stations 47 is shown as two for convenience in drawing, it being understood that the invention does not necessitate having two feeding stations 47. It is advantageous to have at least two feeding stations 47 so that the bird feeder 10 can be balanced when hanging. It is also advantageous to have a small number of feeding station 47 owing to the proclivity of hummingbird to fight among themselves over a bird feeder 10. This fighting effectively prevents the hummingbirds from feeding.

Perches (not shown) may be included located below each feeding station 47. Perches are somewhat superfluous when the feeder 10 is targeted for use by hummingbirds, but necessary when the feed 10 targeted for use by orioles which cannot hover like hummingbirds and therefore must alight on a perch to feed.

The feeding receptacles 48 end a small distance upwardly from the plane defined by the planar face 44. The height above the planer face 44, as indicated by "A" in FIG. 4 is less than one inch and may be varied over that range to adapt the feeder 10 for use by a particular species of bird.

Figure 3:
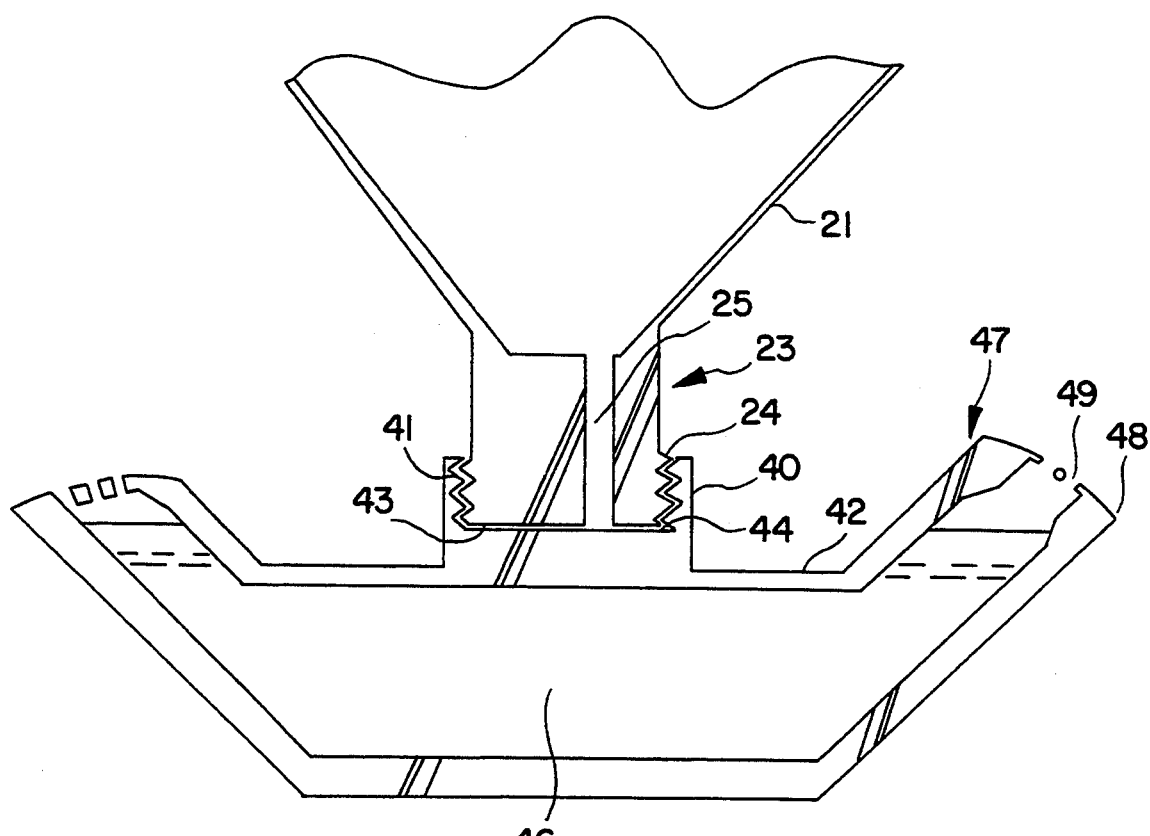
FIG. 3. is an enlarged partial cutaway view of the reservoir and dispenser parts of the feeder in the shipping position showing the rotatable attachment means in the shipping position.

The external threads 24 of the reservoir 11 and first liquid communication passage 25 are located on the reservoir 11 so as to cooperate with the internal threads 41 and second liquid communication passage 45 such that when the dispenser 13 is placed on reservoir 11 and tightened, the liquid communication passages 25, 45 do not align, as shown in FIG. 3, thereby sealing the liquid food 14 in the reservoir 11 during transport.

In its use, the feeder 10 is manufactured and pre-filled with the liquid food 14 and presented for sale to a retail purchaser. To use the feeder 10 the purchaser selects an appropriate support means (not shown) to locate the feeder 10, such as a tree limb or an artificial device for hanging items in one's yard. The location is preferably where the purchaser can view the feeding birds at the feeder 10 and not too close to human activity. Hummingbirds can be quite shy and while avoiding the human activity inadvertently avoid the feeder 10. However, after the hummingbirds become more familiar with the territory and the feeder 10, the feeder 10 can be moved closer to the viewing area for better viewing.

After selecting the location for the feeder 10, as shown in FIG. 1, the purchaser removes the cover 12 from the reservoir 11 by deforming the cover lips 33 and parting them from reservoir shipping groove 26.1. The reservoir 11 is then inverted and the cover 12 is placed in the feeding position by placing the cover 12 over the base 20 of the reservoir 11 and deforming the lips 33 and moving the cover 12 so that the lips 33 are placed into the feeding groove 26.2, as shown in FIG. 2. The feeder 10 may now be placed in the selected location by attaching the hanger 30 over the support means.

The feeder is now located and all that needs to be done is present the liquid food 14 for utilization by the selected birds. The purchaser need only slightly turn the dispenser 13 with respect to the reservoir 11 from the position as exemplified in FIG. 1 to align the alignment marks 27, 50, as shown in FIG. 2, and thereby align the liquid communication passages 25, 45 allowing the liquid food 14 to flow through the liquid communication passages 25, 45 into hollow base 42. The level of the liquid food 14 rises in the hollow base 42 and the feeding stations 47 to the level of the planar face 44 and is thus presented in the feeding receptacles 48 for consumption by the selected birds. The purchaser may now depart and enjoy watching the attracted birds.

When the feeder 10 is emptied of liquid food 14 by the birds or the liquid food 14 becomes fouled by microorganisms and the like the feeder 10 should be emptied, cleaned, and refilled. Feeder 10 may be removed by detaching hanger 30. Dispenser 13 is removed from the reservoir 11 by rotating the dispenser in a counterclockwise direction with respect to the reservoir 11, thereby unscrewing the external threads 24 from the internal threads 41 and separating the dispenser 13 from the reservoir 11.

The feeder 10 may refilled after removing any remaining liquid food 14, cleaning the dispenser 13 and reservoir 11, and refilling the reservoir with additional liquid food 14. The feeder may then be reassembled by mating the external threads 24 with the internal threads 41 and rotating the dispenser 13 in a clockwise direction with respect to the reservoir 11 until tight. In this position the alignment marks 27, 50 and therefore the liquid communication passages 25, 45 are not aligned and the liquid food 14 remains in reservoir 11 and cannot flow through the second liquid passage to the base 42 so as to prevent spillage. Feeder 10 is then removed to the selected location and replaced on the support means. The purchaser then realigns the alignment marks 27, 50 allowing the liquid food 14 to flow through the liquid communication passages 25, 45 filling the hollow base 42 and rising to present itself at the feeding stations 47. The purchaser may again depart and resume enjoying watching the attracted birds.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A bird feeder for feeding liquid food to birds having a food reservoir, a cover integrating a hanger and a shipping container, and a detachable dispenser comprising, in combination;
    a. the reservoir further being an elongate container having a downwardly tapered first end terminating in a rotatable attachment means for attaching the reservoir to the dispenser and a second closed end, the reservoir further having a means for detachably attaching the reservoir to the cover in either a hanging or a shipping position;
    b. the cover further having a hanger extending from the one end of the cover, the hanger extending outwardly therefrom in an open loop, the cover also having an attachment means for cooperatively attaching the reservoir to the cover in either a hanging or shipping position;
    c. the dispenser having a neck and a base, the neck facing upwardly and having a central opening terminating in a planar face, the neck further being adapted for rotatable attachment to the dispenser rotatable attachment means, and having an openable passage through the planar face selectively cooperating with the rotatable attachment means of the reservoir for controlling the flow of liquid food therebetween, the base being attached below the neck and having a hollow metering receptacle formed therein and at least one outwardly extending feeding station terminating in an upturned feeding receptacle, the feeding receptacle located a small distance above the planar face and having at least one feeding orifice.

2. The invention as described in claim 1 wherein the rotatable attachment means on the reservoir is external threads and the neck of the dispenser internal threads matable with the reservoir external threads.

3. The invention as described in claim 1 wherein the detachable attachment means on the reservoir is a pair of peripheral inwardly extending annular grooves and the cover attachment means is an inwardly extending lip.

4. The invention as described in claim 1 wherein each outwardly extending feeding station further includes a perch located below the upturned feeding receptacle.

5. The invention as described in claim 1 wherein the reservoir is round in cross section.

6. The invention as described in claim 1 wherein the reservoir is a transparent red in color.

7. The invention as described in claim 1 wherein the hanger is intregally molded into the cover.

* * * * *